United States Patent
Ghabra

(10) Patent No.: US 9,811,956 B2
(45) Date of Patent: Nov. 7, 2017

(54) PASSIVE ENTRY SYSTEM AND METHOD FOR A VEHICLE

(71) Applicant: Lear Corporation, Southfield, MI (US)

(72) Inventor: Riad Ghabra, Dearborn Heights, MI (US)

(73) Assignee: Lear Corporation, Southfield, MI (US)

( * ) Notice: Subject to any disclaimer, the term of this patent is extended or adjusted under 35 U.S.C. 154(b) by 198 days.

(21) Appl. No.: 14/842,002

(22) Filed: Sep. 1, 2015

(65) Prior Publication Data

US 2015/0371471 A1    Dec. 24, 2015

Related U.S. Application Data

(63) Continuation of application No. 12/478,931, filed on Jun. 5, 2009, now Pat. No. 9,129,454.

(51) Int. Cl.
*G07C 9/00* (2006.01)
*B60R 25/00* (2013.01)

(52) U.S. Cl.
CPC .......... *G07C 9/00103* (2013.01); *B60R 25/00* (2013.01); *G07C 9/00309* (2013.01); *G07C 2209/63* (2013.01)

(58) Field of Classification Search
CPC ............ G07C 9/00309; G07C 2209/63; G07C 9/00103; B60R 25/00
See application file for complete search history.

(56) References Cited

U.S. PATENT DOCUMENTS

| | | | |
|---|---|---|---|
| 5,157,389 A | 10/1992 | Kurozu et al. | |
| 5,736,935 A * | 4/1998 | Lambropoulos | ........ B60R 25/04 123/179.2 |
| 5,973,611 A | 10/1999 | Kulha et al. | |
| 6,208,239 B1 | 3/2001 | Mueller et al. | |
| 6,522,241 B1 | 2/2003 | Baudard | |
| 6,621,178 B2 | 9/2003 | Morillon | |
| 6,658,328 B1 | 12/2003 | Alrabady et al. | |
| 6,778,065 B1 | 8/2004 | Asakura et al. | |
| 6,853,296 B2 | 2/2005 | Chandebois | |
| 6,906,612 B2 | 6/2005 | Ghabra et al. | |
| 6,943,664 B2 | 9/2005 | Brillon et al. | |
| 7,098,769 B2 | 8/2006 | Ott | |
| 7,230,577 B2 | 6/2007 | Tanaka | |
| 7,245,200 B2 | 7/2007 | Inoguchi | |
| 7,433,647 B2 | 10/2008 | LeMense et al. | |
| 7,446,648 B2 | 11/2008 | Ghabra | |
| 7,663,471 B2 * | 2/2010 | Nakashima | ......... B60R 25/2009 340/10.1 |
| 2001/0028296 A1 * | 10/2001 | Masudaya | .......... G07C 9/00309 340/5.61 |
| 2004/0119628 A1 | 6/2004 | Kumazaki et al. | |
| 2004/0217850 A1 | 11/2004 | Perttunen et al. | |
| 2004/0227615 A1 | 11/2004 | John et al. | |

(Continued)

*Primary Examiner* — James Yang
(74) *Attorney, Agent, or Firm* — Brooks Kushman P.C.

(57) ABSTRACT

A method includes transmitting polling signals from antennas at respective positions about a vehicle. Each polling signal includes identifying information. The method further includes receiving an acknowledgement signal from a remote unit. The acknowledgement signal includes information indicative of each polling signal received by the remote unit. The method further includes determining a position of the remote unit relative to the vehicle based upon the information of the acknowledgement signal.

20 Claims, 3 Drawing Sheets

(56) References Cited

U.S. PATENT DOCUMENTS

| | | |
|---|---|---|
| 2004/0233047 A1 | 11/2004 | King et al. |
| 2006/0114100 A1 | 6/2006 | Ghabra et al. |
| 2006/0255906 A1 | 11/2006 | Ghabra et al. |
| 2006/0279467 A1 | 12/2006 | LeMense et al. |
| 2007/0200670 A1 | 8/2007 | McBride et al. |
| 2007/0200672 A1* | 8/2007 | McBride ............... B60R 25/245 340/5.72 |

* cited by examiner

PASSIVE ENTRY SYSTEM AND METHOD FOR A VEHICLE

CROSS-REFERENCE TO RELATED APPLICATIONS

This application is a continuation of U.S. application Ser. No. 12/478,931, filed Jun. 5, 2009, now U.S. Pat. No. 9,129,454; the disclosure of which is hereby incorporated in its entirety by reference herein.

TECHNICAL FIELD

One or more embodiments of the present disclosure relate to a passive entry system that may be used to determine the location of a remote transmitter relative to a vehicle.

BACKGROUND

Exemplary passive entry systems for vehicles are described in U.S. Pat. No. 6,906,612 issued to Ghabra et al. and entitled "System and Method for Vehicle Passive Entry Having Inside/Outside Detection;" U.S. Pat. No. 7,446,648 issued to Ghabra and entitled "Passive Activation Vehicle System Alert;" U.S. Pat. No. 4,873,530 issued to Takeuchi et al. and entitled "Antenna Device In Automotive Keyless Entry System;" U.S. Pat. No. 4,942,393 issued to Waraksa et al. and entitled "Passive Keyless Entry System;" U.S. Pat. No. 5,499,022 issued to Boschini and entitled "Remote Control System For Locking And Unlocking Doors And Other Openings In A Passenger Space, In Particular In A Motor Vehicle;" U.S. Pat. No. 5,751,073 issued to Ross and entitled "Vehicle Passive Keyless Entry And Passive Engine Starting System;" U.S. Pat. No. 6,049,268 issued to Flick and entitled "Vehicle Remote Control System With Less Intrusive Audible Signals And Associated Methods;" and U.S. Pat. No. 6,236,333 issued to King and entitled "Passive Remote Keyless Entry System."

SUMMARY

A method includes transmitting polling signals from antennas at respective positions about a vehicle. Each polling signal includes identifying information. The method further includes receiving by at least one of the antennas an acknowledgement signal from a remote unit. The acknowledgement signal includes information indicative of each polling signal received by the remote unit. The method further includes determining a position of the remote unit relative to the vehicle based upon the information of the acknowledgement signal.

The polling signals may be transmitted sequentially or simultaneously from the antennas.

The method may further include transmitting an authentication signal from the one of the antennas positioned closest to the position of the remote unit. In this case, the method may further include controlling a vehicle function in response to receiving a correct response to the authentication signal from the remote unit.

The polling signals transmitted from the antennas may include a first polling signal transmitted from a first antenna positioned on a first side of the vehicle and a second polling signal transmitted from a second antenna positioned on a second side of the vehicle. In this case, the position of the remote unit is determined to be on the first side of the vehicle when the information of the acknowledgement signal identifies the first polling signal being received by the remote unit; and the position of the remote unit is determined to be on the second side of the vehicle when the information of the acknowledgement signal identifies the second polling signal being received by the remote unit.

The polling signals transmitted from the antennas may further include a third polling signal transmitted from a third antenna positioned on the first side of the vehicle and a fourth polling signal transmitted from a fourth antenna positioned on the second side of the vehicle. In this case, the first antenna may be at a position adjacent a front door on the first side of the vehicle, the third antenna may be at a position adjacent a rear door on the first side of the vehicle, the second antenna may be at a position adjacent a front door on the second side of the vehicle, and the fourth antenna may be at a position adjacent a rear door on the second side of the vehicle. In this case, the position of the remote unit is determined to be near the front door on the first side of the vehicle when the information of the acknowledgement signal identifies the first polling signal being received by the remote unit; the position of the remote unit is determined to be near the front door on the second side of the vehicle when the information of the acknowledgement signal identifies the second polling signal being received by the remote unit; the position of the remote unit is determined to be near the rear door on the first side of the vehicle when the information of the acknowledgement signal identifies the third polling signal being received by the remote unit; and the position of the remote unit is determined to be near the rear door on the second side of the vehicle when the information of the acknowledgement signal identifies the fourth polling signal being received by the remote unit.

The acknowledgment signal from the remote unit may be received by at least one of the antennas.

A system includes a transmitter, a receiver, and a controller. The transmitter is configured to transmit polling signals via antennas at respective positions about a vehicle. Each polling signal includes identifying information. The receiver is configured to receive an acknowledgement signal from a remote unit. The acknowledgement signal includes information indicative of each polling signal received by the remote unit. Thea controller is configured to determine a position of the remote unit relative to the vehicle based upon the information of the acknowledgement signal.

A method includes transmitting polling signals from antennas at respective positions about a vehicle. Each polling signal includes identifying information. The method further includes receiving, from a remote unit, at least one acknowledgement signal. Each acknowledgement signal includes information indicative of at least one polling signal received by the remote unit. The method further includes obtaining a position of the remote unit relative to the vehicle based on a position of each antenna which transmitted a polling signal received by the remote unit according to the information of the at least one acknowledgment signal.

DETAILED DESCRIPTION

Figure 1:
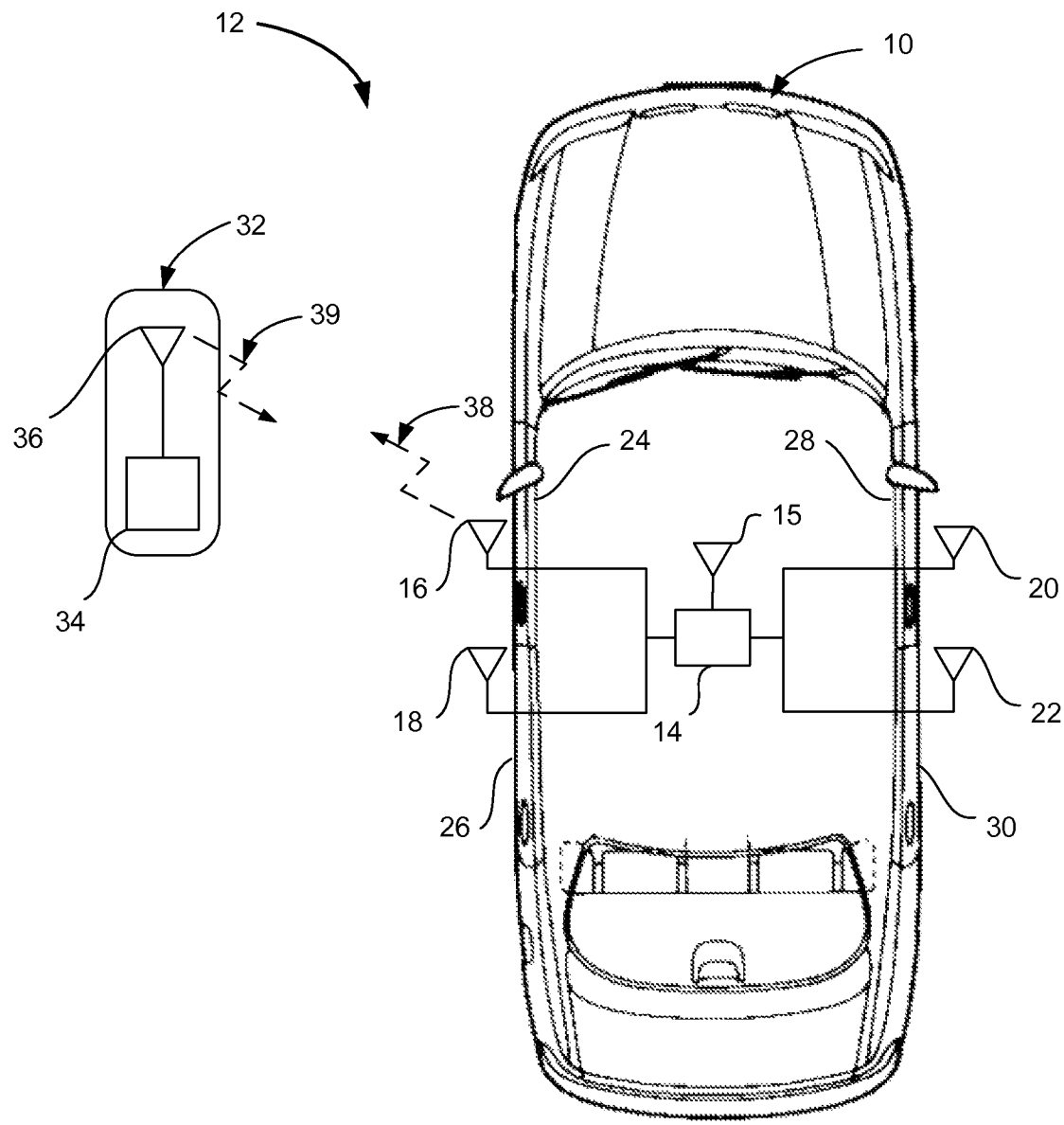
FIG. 1 is a top view of a vehicle that includes a passive entry system according to one non-limiting embodiment of the present disclosure.

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Conventional remote keyless entry (RKE) systems may include a remote hand held transmitter, which is conventionally referred to as a "fob." The RKE transmitter may be a separate unit, or may be part of an ignition key head. Such RKE transmitter may generally transmit radio frequency (RF) signals to a vehicle in order to lock or unlock vehicle doors, open or close a vehicle sliding door, unlock a vehicle trunk, activate internal and/or external vehicle lights, activate a "panic" alarm, and/or to perform a variety of other functions related to the operation of the vehicle.

In that regard, a RKE system may also include a controller installed in the vehicle. The controller may include a transceiver unit configured to allow for wireless communication between the controller and the RKE transmitter. The controller may further be configured so as to be in communication with one or more door locking mechanisms. The controller may operate the door lock mechanisms in order to lock and/or unlock the vehicle doors in response to a signal received from the RKE transmitter. Similarly, the controller may be configured so as to be in communication with other vehicle devices to control vehicle operations in response to other signals received from the RKE transmitter.

Such conventional RKE systems may be characterized as "active" in nature, wherein a switch or pushbutton on the RKE transmitter must be activated by an operator in order to have a desired remote access function performed (e.g., locking and/or unlocking the vehicle doors). Alternatively, RKE systems may also be passive in nature, where no such switch or pushbutton activation by an operator is required in order to perform a desired remote access function.

Such passive entry system may also include a remote transmitter (e.g., fob or card) that may be configured to communicate with a controller installed within the vehicle. However, unlike the active RKE system, the passive entry system may operate the door lock mechanisms without an operator activating a switch or pushbutton on the remote transmitter. Instead, the controller may provide communication with door locking mechanisms to lock and/or unlock the vehicle doors when the remote transmitter is within some pre-defined distance from the vehicle. However, conventional passive entry systems fail to accurately determine the location and/or distance of the remote transmitter relative to the vehicle. For example, conventional passive entry systems fail to distinguish if a remote transmitter is approaching a driver side front door or a passenger side front door when an operator approaches the vehicle. Also, conventional passive entry systems fail to determine how far the remote transmitter is relative to the vehicle.

In light of the foregoing, FIG. 1 illustrates a vehicle 10 that includes a passive entry system, denoted generally by reference numeral 12, according to one non-limiting aspect of the present disclosure. Passive entry system 12 may include a controller 14 located within vehicle 10. Controller 14 may further include one or more transceiver units having a receiver and/or transmitter unit that communicate with one or more antennas 15, 16, 18, 20, 22 positioned about vehicle 10. The present disclosure contemplates that the transceiver units may be separate from controller 14 and may be positioned about, or included in combination with antennas 15, 16, 18, 20, 22. Controller 14 may further be configured to operate a door lock mechanism (not shown) that may be included within a driver-side front door, driver-side rear door, passenger-side front door, and/or passenger-side rear door 24, 26, 28, 30.

As is further illustrated by FIG. 1, antennas 16, 18, 20, and 22 may be positioned about or near the doors 24, 26, 28, 30 of vehicle 10. As such, each antenna 16, 18, 20, and 22 may be configured to transmit and/or receive a unique signal indicative of a particular door 16, 18, 20, and 22 of vehicle 10. The present disclosure further contemplates that configuration illustrated is not inclusive and that a number of antennas may be included and positioned at various other locations about vehicle 10. For example, the present disclosure contemplates that vehicle 10 may include a rear hatch (not shown). As such, a fifth antenna (not shown) may be positioned about or near the rear hatch of vehicle 10. The fifth antenna may be configured to transmit and/or receive a unique signal indicative of the rear hatch of vehicle 10.

Passive entry system 12 may further include a remote transmitter 32 (e.g., fob) that may be carried, and/or operated, by an operator. Remote transmitter 32 may include a controller 34 having a transceiver unit. The transceiver unit may include a transmitter and receiver for receiving and/or transmitting signals from remote transmitter 32. The present disclosure also contemplates that the transceiver unit may be separate from controller 34. Remote transmitter 32 may further include an antenna 36 configured to send and/or receive signals to and/or from antennas 15, 16, 18, 20, 22.

The present disclosure further contemplates that antenna 36 located within remote transmitter 32, and/or antennas 15, 16, 18, 20, 22 located within vehicle 10, may be configured to transmit Low Frequency (LF) signals. In addition, the present disclosure contemplates that the LF signals transmitted and/or received by antennas 15, 16, 18, 20, 22, and 36 may take the form of very short and/or abbreviated message schemes (e.g., on the order of 2 to 10 bits). Furthermore, the signals sent and/or received by antennas 15, 16, 18, 20, 22, and 36 may be encrypted to ensure secure transmission.

Remote transmitter 32 may further be configured to lock and/or unlock doors 24, 26, 28, 30 using one or more buttons (not shown) located on remote transmitter 32 (e.g., active operation). However, the present disclosure contemplates that remote transmitter 32 may further be configured to automatically lock and/or unlock doors 24, 26, 28, 30 when the operator is within a predetermined distance from vehicle 10 (e.g., passive operation).

In operation, controller 14 may be configured so as to transmit one or more polling signals 38 using one or more of antennas 16, 18, 20, 22. If remote transmitter 32 is a predetermined distance from the vehicle 10, then remote transmitter 32 may receive polling signal 38 using antenna 36. Upon receiving polling signal 38 using at least one of antenna 15, 16, 18, 20, or 22, controller 34 may respond by transmitting an acknowledgement signal 39 using antenna 36. If controller 14 determines the acknowledgement signal 39 is valid, then controller 14 may proceed to activate and/or pre-activate (e.g., initialize) the door lock mechanism of one or more of doors 24, 26, 28, 30. As such, the time required to lock and/or unlock one or more of doors 24, 26, 28, 30 prior to the operator engaging one of the door handles may be significantly reduced.

In one preferred embodiment of the present disclosure, antenna 15 may be configured so as to receive activation signal 39 sent by transmitter 32. Activation signal 39 may be in response to one or more polling signals transmitted by antenna 16, 18, 20, or 22. As shown in FIG. 1, antenna 15 may be centrally positioned within vehicle 10. Such placement may allow antenna 15 the capability of receiving acknowledgement signal 39 irrespective of the location of transmitter 32. For example, by using a central position, antenna 15 may receive activation signal 39 if transmitter 32 is located near the front, rear or side of vehicle 10.

Alternatively, controller 14 may authenticate acknowledgement signal 39 received by antennas 15, 16, 18, 20, and/or 22. For example, controller 14 may transmit an authentication signal to remote transmitter 32 using at least one of antennas 16, 18, 20, 22. In response to the authentication signal, remote transmitter 32 may transmit a response authentication signal. If controller 14 determines the response authentication signal is valid, then controller 14 may activate and/or pre-activate (e.g., initialize) the door lock mechanism of one or more of doors 24, 26, 28, 30. Again, the time required to lock and/or unlock one or more of doors 24, 26, 28, 30 prior to the operator engaging one of the door handles may be significantly reduced.

Figure 2:
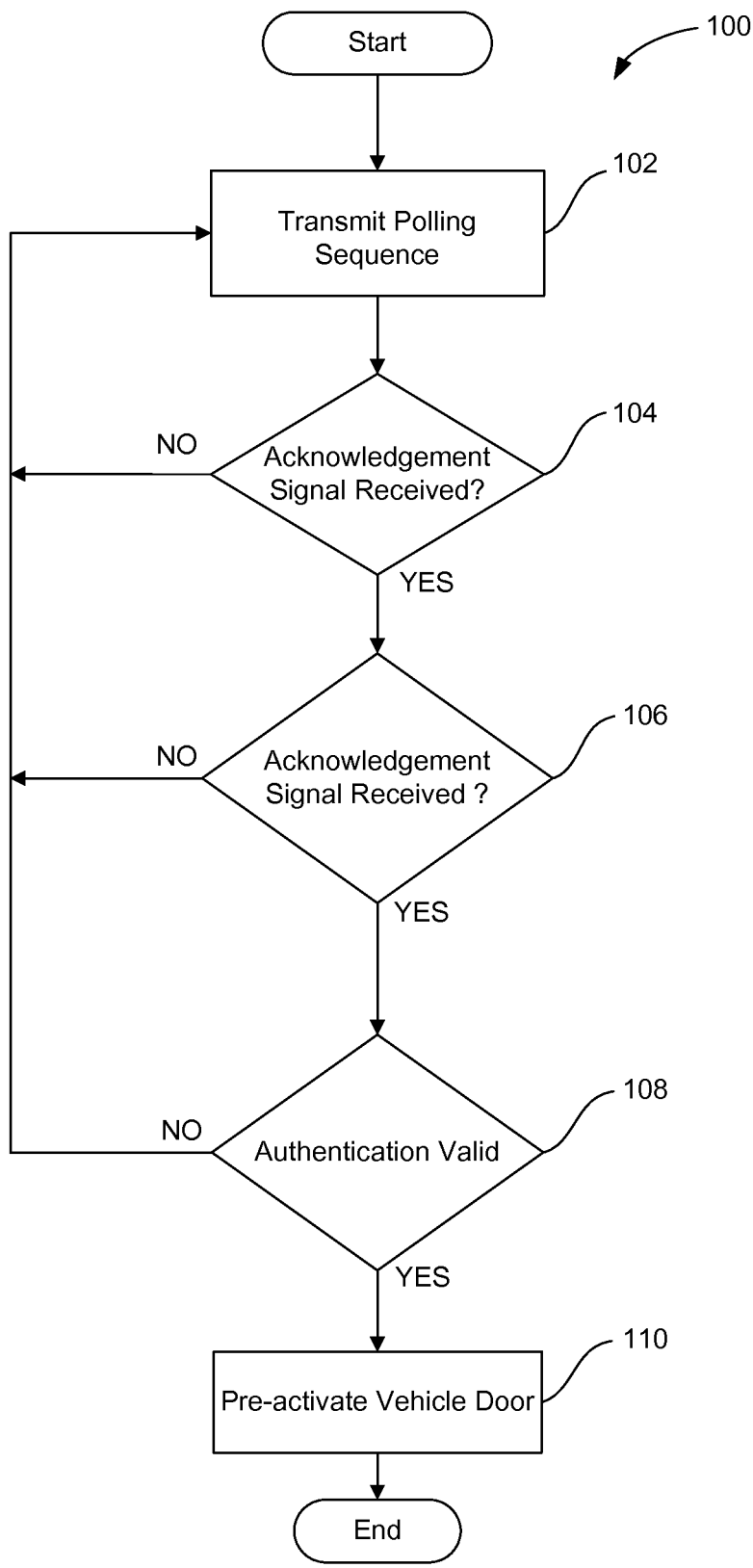
FIG. 2 is an exemplary flow diagram for detecting objects approaching the vehicle according to one non-limiting embodiment of the present disclosure.

FIG. 2 illustrates an exemplary, flow diagram 100 according to one or more embodiments of the present disclosure. The present disclosure contemplates that flow diagram 100 may be used by the passive entry system 12 in order to determine the location and/or distance of remote transmitter 32 relative to vehicle 10. However, the present disclosure further contemplates that flow diagram 100 is merely exemplary and the operation, function, or steps may be performed in a fashion other than the order described herein.

To begin, operation 100 illustrates that controller 14 may transmit one or more polling sequences. The polling sequence may include one or more polling signals transmitted by one or more of antennas 16, 18, 20, 22. Furthermore, the present disclosure contemplates that controller 14 may use antennas 16, 18, 20, 22 to transmit polling sequences in a number of combinations.

Figure 3:
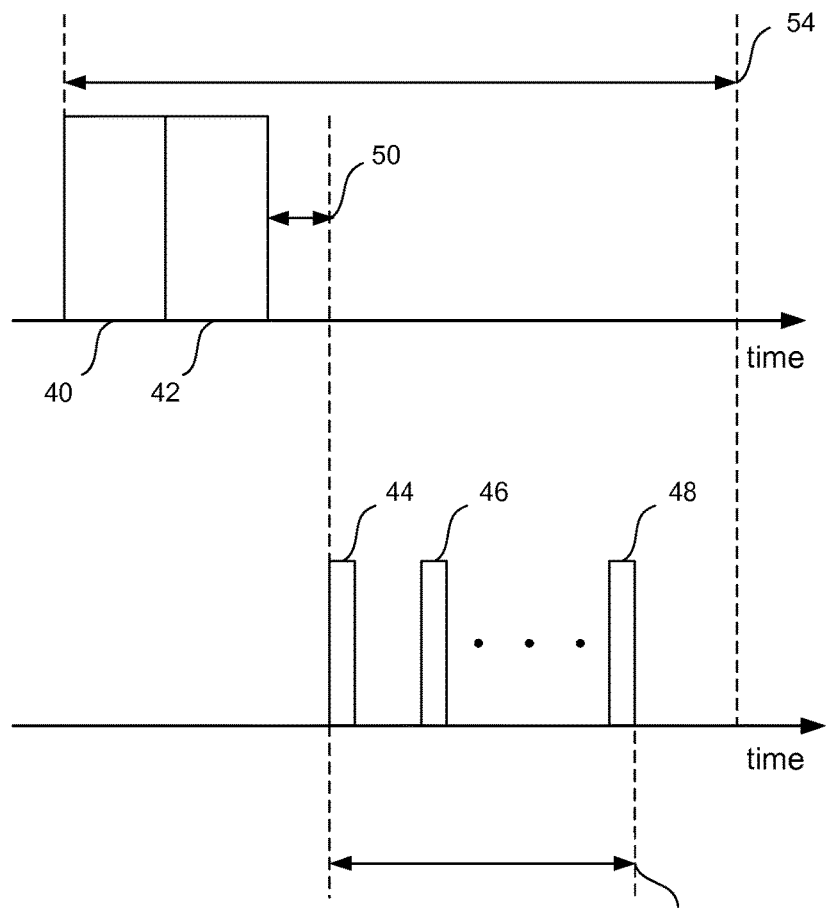
FIG. 3 is a graphically illustration of an exemplary pair of polling sequences and acknowledgement signals according to one non-limiting embodiment of the present disclosure.

For example, FIG. 3 is a graphical illustration showing a pair of polling sequences 40, 42. Polling sequence 40 may be representative of a pair of polling signals transmitted by antennas 16 and 22 or by antennas 18 and 20. Likewise, polling sequence 42 may be representative of a pair of polling signals transmitted by antennas 18 and 20 or by antennas 16 and 22. The pair of polling signals transmitted by polling sequence 40 and 42 may include unique information so as to differentiate each polling signal to a side of vehicle 10.

For example, antenna 16 may be used by controller 14 during polling sequence 40 to transmit a polling signal indicative of door 24. Furthermore, antenna 22 may be used by controller 14 during polling sequence 40 to transmit a second polling signal indicative of door 30. As such, the first polling signal may be representative of one side of vehicle 10 and the second polling signal may be representative of a second side of vehicle 10.

Likewise, antenna 18 may be used by controller 14 during polling sequence 42 to transmit a third polling signal indicative of door 26. Furthermore, antenna 20 may be used by controller 14 during polling sequence 42 to transmit a fourth polling signal indicative of door 28. As such, the third polling signal may be representative of one side of vehicle 10 and the fourth polling signal may be representative of a second side of vehicle 10.

In addition, the first, second, third, and fourth polling signals transmitted by controller 14 during polling sequences 40, 42 may further be indicative of a particular door 24, 26, 28, 30 located on the first side or second side of vehicle 10. The present disclosure contemplates that the polling signals transmitted during polling sequences 40, 42 may be performed simultaneously. In addition, polling sequences 40, 42 are transmitted sequentially (e.g., transmit polling sequence 40 then polling sequence 42).

The present disclosure contemplates that the order of polling sequences 40, 42 may not be consequential because each polling signal transmitted contains unique information indicative of a particular door 24, 26, 28, 30 and side of vehicle 10. However, it should be further noted that the combination of polling signals transmitted during polling sequences 40, 42 may be different than those illustrated above. Once the controller 14 has transmitted the one or more polling sequences, the flow diagram may proceed to operation 104.

In operation 104, controller 14 determines whether an acknowledgement signal has been received by one or more of the antennas 15, 16, 18, 20, 22. Furthermore, controller 14 determines whether the acknowledgement signal received is in response to one or more of the polling sequences transmitted by antennas 16, 18, 20, 22. The present disclosure further contemplates that antenna 15 may be used solely by controller 14 in order to receive the acknowledgement signal. Antenna 15 may be centrally positioned within vehicle 10 so as to be capable of receiving the acknowledgement signal irrespective of the location of transmitter 32.

With reference again to FIG. 3, a plurality of acknowledgement signals 44, 46, and 48 are illustrated which may be transmitted by one or more remote transmitters. Each acknowledgement signal 44, 46, 48 may be transmitted by a remote transmitter that has received one or more of the polling signals transmitted during each polling sequence 40, 42. Furthermore, each acknowledgement signal 44, 46, and 48 transmitted may indicate the polling signal received by remote transmitter 32.

FIG. 3 further illustrates a time delay 50 may exist between the transmission of polling sequences 40, 42 and the transmission of at least first acknowledgement signal 44. Time delay 50 may be representative of latent time delay of transmission and/or reception of the polling signals, or processor latency of either controller 14 or 34. FIG. 3 also illustrates that a total response period 52 may exist within which at least one acknowledgement signal 44, 46, and/or 48 may be required to respond to either polling sequence 40, 42. Lastly, FIG. 3 illustrates that a total time period may exist prior before a new pair of polling sequences may be transmitted.

Figure 4:
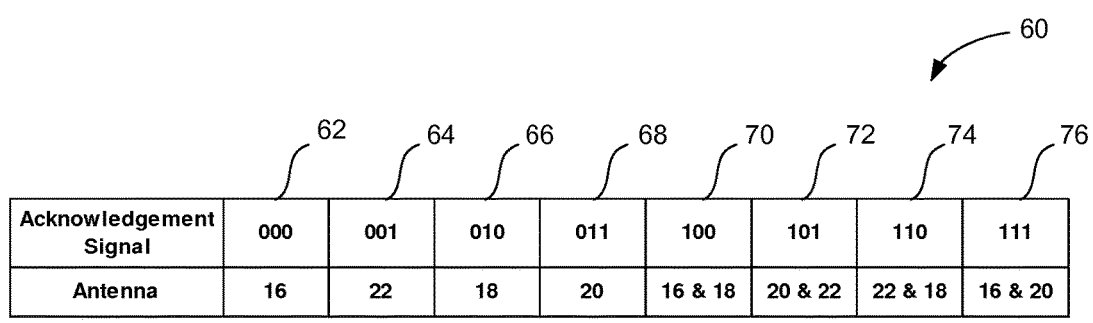
FIG. 4 is an exemplary chart illustrating acknowledgement signals according to one non-limiting embodiment of the present disclosure.

FIG. 4 illustrates a chart 60 indicative of the information that may be included within the acknowledgement signal transmitted by remote transmitter 32 in response to one or more polling sequences 40, 42. For example, acknowledgement signal 62 may be transmitted by remote transmitter 32 in response to a polling signal received from antenna 16. Acknowledgement signal 64 may be transmitted by remote transmitter 32 in response to a polling signal received from antenna 22. Acknowledgement signal 72 may be transmitted by remote transmitter 32 in response to a polling signal received from antennas 20 and 22. Furthermore, acknowledgement signal 76 may be transmitted by remote transmitter 32 in response to a polling signal received from antenna 16 and 20. The present disclosure contemplates that chart 60 illustrated in FIG. 4 may be modified so that any combination of acknowledgement signals may be transmitted in response to any combination of polling signals received by remote transmitter 32. Furthermore, the present disclosure contemplates that chart 60 is not inclusive and the information included within the acknowledgement signal may change in accordance with a particular design or application.

For example, the present disclosure contemplates that each acknowledgement signal 44, 46, 48 may include preamble and header information. In addition, the present disclosure contemplates that each acknowledgement signal 44, 46, 48 may further include information indicative of a particular remote transmitter. Each remote transmitter may transmit a thirty-two (32) bit identification signal that controller 14 may associate to a particular remote transmitter. As such, controller 14 may further be able to distinguish between, as well as, determine the location of a particular remote transmitter relative to vehicle 10.

With reference back to FIG. 2, if controller 14 does not receive an acknowledgement signal in response to the polling signals transmitted during either polling sequence 40 or polling sequence 42, then flow diagram 100 returns to operation 102. However, if controller 14 receives an acknowledgement signal from remote transmitter 14, then flow diagram 100 proceeds to operation 106.

In operation 106, controller 14 determines if the acknowledgement signal is received in response to at least one of polling sequences 40, 42 transmitted. For example, with reference to FIG. 4, if controller 14 receives acknowledgement signal 62 or 64, then controller 14 may determine that remote transmitter 32 received and may be responding to polling sequence 40. Likewise, if controller 14 receives acknowledgement signals 66 or 68, then controller 14 may determine that remote transmitter 32 received and may be responding to polling sequence 42.

However, the present disclosure contemplates that remote transmitter 32 may be in such a location so as to receive a polling signal from both polling sequences 40, 42. For example, if an operator was standing near a rear end or front end of vehicle 10, then remote transmitter 32 may respectively receive the polling signals transmitted by both antennas 18 and 22 or antennas 16 and 20. Stated differently, if remote transmitter 32 is positioned near the front end or rear end of the vehicle, then remote transmitter 32 may receive polling signals from both polling sequences 40, 42. In turn, remote transmitter 32 may transmit acknowledgement signals 74 or 76 indicating that signals from each polling sequence 40, 42 were received. Likewise, if the operator is standing between doors 24 and 26 or between doors 28 and 30, then remote transmitter 32 may transmit, and controller 14 may respectively receive, acknowledgement signals 70 or 72. Again, acknowledgement signals 70 and 72 may be indicative of the remote transmitter receiving polling signals from each of polling sequences 40, 42.

If controller 14 receives acknowledgement signals 70, 72, 74, or 76 indicating that the remote transmitter has received polling signals from each of polling sequences 40, 42, then controller 14 may determine the field strength of the acknowledgement signal at each of respective antennas 15, 16, 18, 20, and 22. For example, if controller 14 receives acknowledgement signal 70, then controller 14 may determine the field strength of acknowledgement signal 70 at antennas 16 and 18. If controller 14 determines the field strength is stronger at antenna 16, then controller 14 may determine that remote transmitter 32 is positioned in a location closest to door 24. Alternatively, if controller 14 determines the field strength is stronger at antenna 18, then controller 14 may determine that remote transmitter 32 is positioned in a location closest to door 26.

The present disclosure further contemplates that operation 106 may verify the acknowledgement signal received by controller 14. Controller 14 may verify the acknowledgement signal by re-transmitting either polling sequence 40 or 42. For example, polling sequence 40 may include polling signals transmitted by antennas 16 and 22 and polling sequence 42 may include polling signals transmitted by antennas 18 and 20. If remote transmitter 32 transmits either acknowledgement signal 62 or 64, then controller 14 may determine that remote transmitter 32 is responding to polling sequence 40 and is positioned in a location near door 24 or 30. As such, controller 14 may re-transmit polling sequence 42 to verify that remote transmitter 32 did not erroneously respond to polling sequence 40. If remote transmitter 32 does not respond to the re-transmitted polling sequence 42, controller 14 may determine that remote transmitter 32 is located near door 24 or 30 and may proceed to operation 108. However, if remote transmitter 32 does respond to the re-transmitted polling sequence 42, the flow diagram returns to operation 102.

Likewise, if remote transmitter 32 responds to polling sequence 42 by transmitting either acknowledgement signal 58 or 68, then controller 14 may determine that the remote transmitter 32 is positioned in a location near door 26 or 28. As such, controller 14 may re-transmit polling sequence 40 to verify that remote transmitter 32 did not erroneously respond to polling sequence 42. If remote transmitter 32 does not respond to the re-transmitted polling sequence 40, then controller 14 may determine that remote transmitter 32 is located near door 26 or 28 and may proceed to operation 108. However, if remote transmitter 32 does respond to the re-transmitted polling sequence 40, the flow diagram returns to operation 102.

In operation 108, controller 14 may authenticate the acknowledgement signal received. The present disclosure contemplates that controller 14 may transmit an authentication signal using antenna 16, 18, 20, 22 that is determined to be within the closest proximity of remote transmitter 32. If remote transmitter 32 incorrectly responds to the authentication signal, then flow diagram 100 returns to operation 102. However, if remote transmitter 32 correctly responds to the authentication signal, then flow diagram 100 proceeds to operation 110.

In operation 110, controller 14 may pre-activate and/or activate one or more door lock mechanisms. More particularly, controller 14 may pre-activate and/or activate the door lock mechanism of door 24, 26, 28, and/or 30 that is within the closest proximity to remote transmitter 32.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:
1. A method comprising:
transmitting polling signals from antennas at respective positions about a vehicle, each polling signal including identifying information;

receiving an acknowledgement signal from a remote unit, the acknowledgement signal including data within the acknowledgment signal indicative of each polling signal received by the remote unit; and determining a position of the remote unit relative to the vehicle based upon the data within the acknowledgement signal.

2. The method of claim 1 wherein:
the polling signals are transmitted sequentially from the antennas.

3. The method of claim 1 wherein:
the polling signals are transmitted simultaneously from the antennas.

4. The method of claim 1 further comprising:
transmitting an authentication signal from the one of the antennas positioned closest to the position of the remote unit.

5. The method of claim 4 further comprising:
controlling a vehicle function in response to receiving a correct response to the authentication signal from the remote unit.

6. The method of claim 1 wherein:
the polling signals transmitted from the antennas include a first polling signal transmitted from a first antenna positioned on a first side of the vehicle and a second polling signal transmitted from a second antenna positioned on a second side of the vehicle.

7. The method of claim 6 wherein:
the position of the remote unit is determined to be on the first side of the vehicle when the data within the acknowledgement signal identifies the first polling signal being received by the remote unit; and
the position of the remote unit is determined to be on the second side of the vehicle when the data within the acknowledgement signal identifies the second polling signal being received by the remote unit.

8. The method of claim 6 wherein:
the polling signals transmitted from the antennas further include a third polling signal transmitted from a third antenna positioned on the first side of the vehicle and a fourth polling signal transmitted from a fourth antenna positioned on the second side of the vehicle;
the first antenna being at a position adjacent a front door on the first side of the vehicle and the third antenna being at a position adjacent a rear door on the first side of the vehicle; and
the second antenna being at a position adjacent a front door on the second side of the vehicle and the fourth antenna being at a position adjacent a rear door on the second side of the vehicle.

9. The method of claim 8 wherein:
the position of the remote unit is determined to be near the front door on the first side of the vehicle when the data within the acknowledgement signal identifies the first polling signal being received by the remote unit;
the position of the remote unit is determined to be near the front door on the second side of the vehicle when the data within the acknowledgement signal identifies the second polling signal being received by the remote unit;
the position of the remote unit is determined to be near the rear door on the first side of the vehicle when the data within the acknowledgement signal identifies the third polling signal being received by the remote unit; and
the position of the remote unit is determined to be near the rear door on the second side of the vehicle when the data within the acknowledgement signal identifies the fourth polling signal being received by the remote unit.

10. The method of claim 1 wherein:
the acknowledgment signal from the remote unit is received by at least one of the antennas.

11. A system comprising:
a transmitter configured to transmit polling signals via antennas at respective positions about a vehicle, wherein each polling signal includes identifying information;
a receiver configured to receive an acknowledgement signal from a remote unit, wherein the acknowledgement signal includes data within the acknowledgment signal indicative of each polling signal received by the remote unit; and
a controller configured to determine a position of the remote unit relative to the vehicle based upon the data within the acknowledgement signal.

12. The system of claim 11 wherein:
the transmitter is further configured to transmit an authentication signal from the one of the antennas positioned closest to the position of the remote unit.

13. The system of claim 12 wherein:
the controller is further configured to control a vehicle function in response to the receiver receiving a correct response to the authentication signal from the remote unit.

14. The system of claim 11 wherein:
the receiver is further configured to receive the acknowledgement signal from the remote unit via at least one of the antennas.

15. A method comprising:
transmitting polling signals from antennas at respective positions about a vehicle, each polling signal including identifying information;
receiving, from a remote unit, at least one acknowledgement signal, each acknowledgement signal including data within the acknowledgment signal indicative of at least one polling signal received by the remote unit to which the acknowledgment signal is responsive; and
obtaining a position of the remote unit relative to the vehicle based on a position of each antenna which transmitted a polling signal received by the remote unit according to the data within the at least one acknowledgment signal.

16. The method of claim 15 wherein:
the acknowledgment signal from the remote unit is received by at least one of the antennas.

17. The method of claim 15 wherein:
the polling signals are transmitted sequentially from the antennas.

18. The method of claim 15 wherein:
the polling signals are transmitted simultaneously from the antennas.

19. The method of claim 15 further comprising:
transmitting an authentication signal from the one of the antennas positioned closest to the position of the remote unit.

20. The method of claim 19 further comprising:
controlling a vehicle function in response to receiving a correct response to the authentication signal from the remote unit.

* * * * *